United States Patent
Ilnicki et al.

(10) Patent No.: US 7,573,914 B2
(45) Date of Patent: Aug. 11, 2009

(54) SYSTEMS AND METHODS FOR SYNCHRONIZING TIME ACROSS NETWORKS

(75) Inventors: Slawomir K. Ilnicki, Los Altos Hills, CA (US); Jefferson B. Burch, Palo Alto, CA (US); Martin Curran-Gray, Dunfermline (GB)

(73) Assignee: Agilent Technologies, Inc., Santa Clara, CA (US)

( * ) Notice: Subject to any disclaimer, the term of this patent is extended or adjusted under 35 U.S.C. 154(b) by 428 days.

(21) Appl. No.: 11/127,354

(22) Filed: May 12, 2005

(65) Prior Publication Data

US 2006/0256820 A1  Nov. 16, 2006

(51) Int. Cl.
*H04J 3/06* (2006.01)
(52) U.S. Cl. ............... 370/519; 370/503; 713/400; 713/500
(58) Field of Classification Search ............... 370/347, 370/350, 395.62, 503, 254, 400, 516, 517, 370/519; 709/208, 237; 375/356; 713/400, 713/401, 500; 455/39, 208, 265, 502
See application file for complete search history.

(56) References Cited

U.S. PATENT DOCUMENTS

| 5,812,749 | A | 9/1998 | Fernandez et al. | |
| 6,985,975 | B1 * | 1/2006 | Chamdani et al. | 710/55 |
| 2002/0116468 | A1 * | 8/2002 | Ishikawa | 709/208 |
| 2004/0073718 | A1 | 4/2004 | Johannessen et al. | |
| 2005/0047445 | A1 * | 3/2005 | Stepanov et al. | 370/503 |
| 2005/0207387 | A1 * | 9/2005 | Middleton et al. | 370/347 |
| 2006/0056559 | A1 * | 3/2006 | Pleasant et al. | 375/356 |

FOREIGN PATENT DOCUMENTS

| EP | 1 657 619 | 7/2006 |
| GB | 2300789 | 11/1996 |
| GB | 2418113 | 3/2006 |

OTHER PUBLICATIONS

GB Search Report dated Jul. 19, 2006.

* cited by examiner

*Primary Examiner*—Alexander Eisen
*Assistant Examiner*—Anthony S Addy

(57) ABSTRACT

By equipping receiving devices in a network with synchronizable clocks it is possible to periodically send an "impulse" signal that is received by all of the clocks at the same (or relatively the same) instant of time. The accuracy of the impulse clock need not be high, only that its signal reach all the clocks approximately at the same time. In one embodiment, a transmitting device, upon receipt of the synchronizing impulse signal, sends a packet of data bearing the sending device's epoch time-stamp to a receiving device. The data packet makes its way through the network element to the receiving device and the time-stamp is used by the receiving device to calculate the difference between the epoch time of the receiver and the epoch time of the sender. Effectively, this procedure removes the unknown network element transit times from the equation and allows the devices to operate in a synchronized manner.

24 Claims, 2 Drawing Sheets

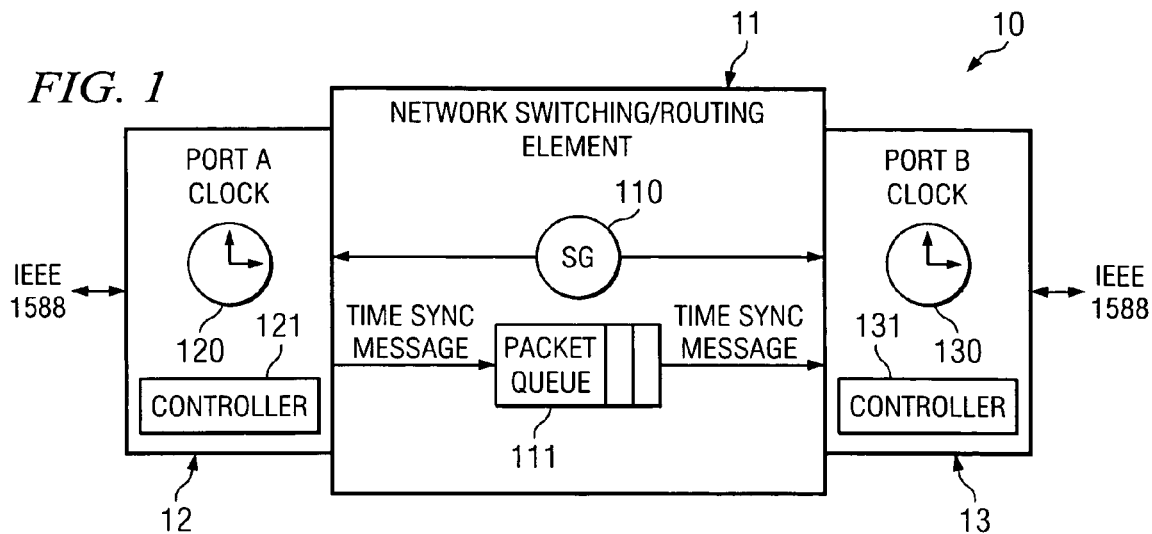
FIG. 1
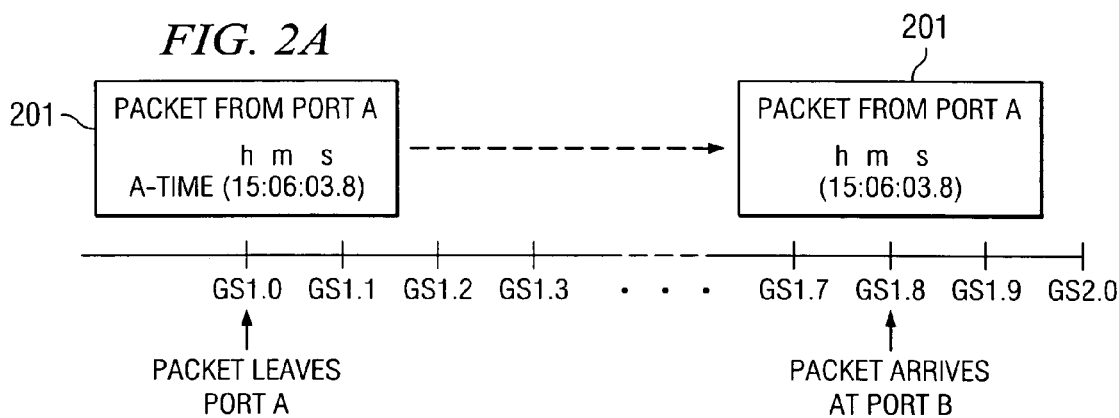
FIG. 2A
FIG. 2B
| | h m s |
|---|---|
| ARRIVAL TIME (AS SEEN BY PORT B) | 15:06:05.2 |
| TRANSIT TIME (AS CALCULATED BY PORT B) | 0.8 |
| SENDING TIME (AS CALCULATED BY PORT B) | 15:06:04.4 |
| ACTUAL SENDING TIME (CONTAINED IN PACKET) | 15:06:03.8 |
| DIFFERENCE (AS CALCULATED BY PORT B) | +.6 |

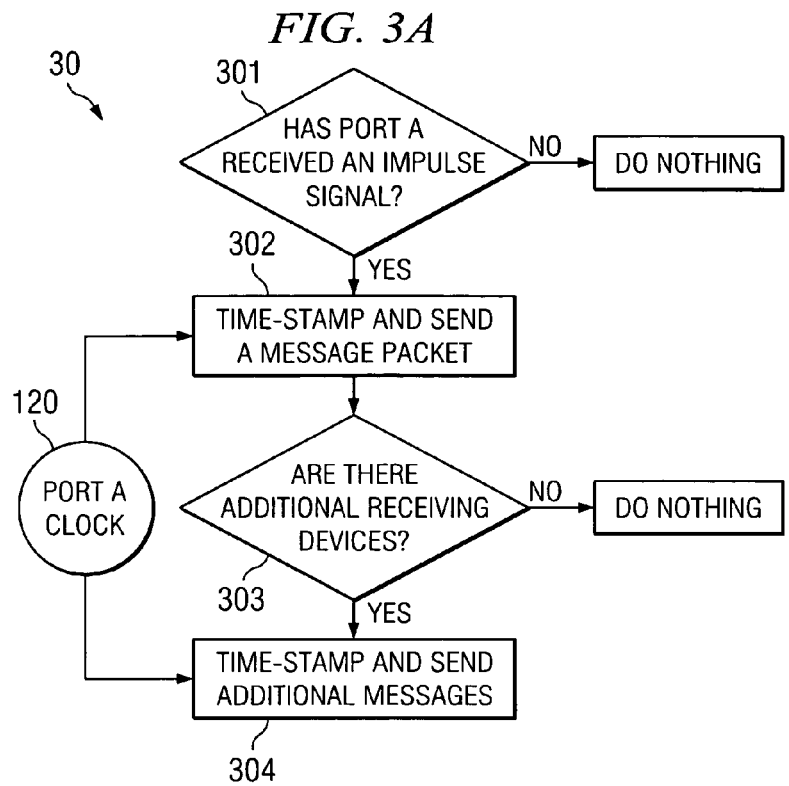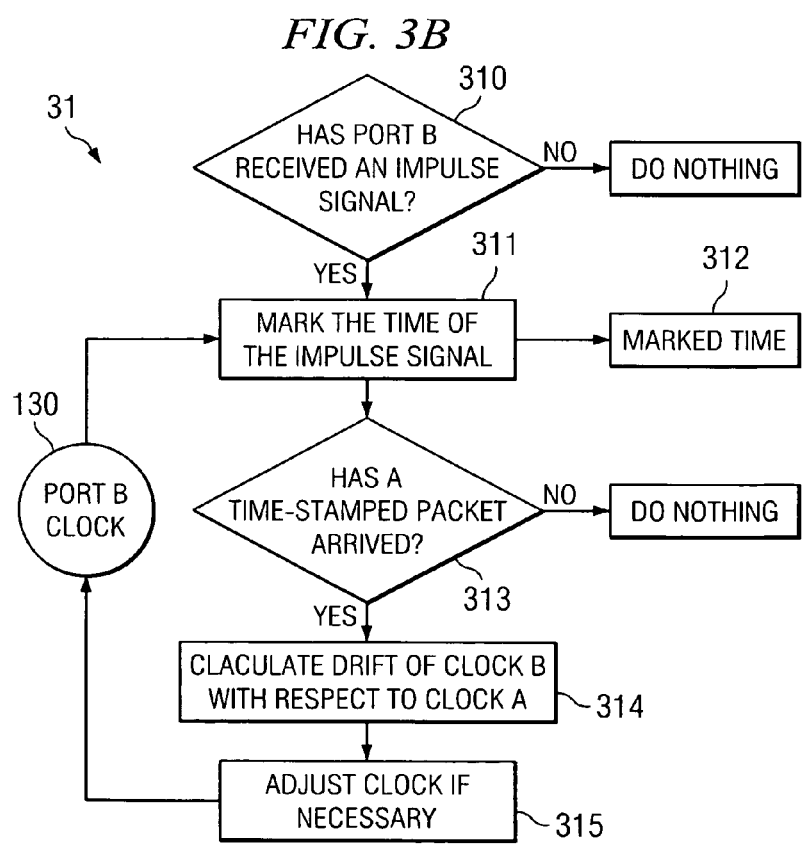

SYSTEMS AND METHODS FOR SYNCHRONIZING TIME ACROSS NETWORKS

TECHNICAL FIELD

This invention relates to time synchronization and more particularly to systems and methods for synchronizing time across networks.

BACKGROUND OF THE INVENTION

Achieving time synchronization in computer networking environments is a challenging task. Different elements in a network, such as PCs/workstations/servers, routers/switches, and even VoIP phones, use NTP (Network Time Protocol), to get their epoch time for synchronization purposes. The accuracy of NTP time is in the order of tens of milliseconds. In many cases this is sufficient. In process automation, however, requirements are more rigid, and the requirement for time synchronization between networked devices is in the order of sub-microsecond accuracy.

This accuracy could be accomplished using the GPS system but the availability of the GPS signal is not assured at all locations due to the requirement of an antenna with a clear sight of the sky (to approximately 50 nsec.). In network performance measurement applications, where the one-way packet delay is measured, the accuracy has to be in the order of sub-milliseconds. Thus, deploying GPS at certain points of a network to perform network measurement is feasible except that, as discussed above, GPS signals are not available at all locations of the network.

In recent years the process automation industry has started deploying the IEEE 1588 standard to perform time synchronization between various devices. IEEE 1588 in its current form is limited to a very small network, typically a LAN segment. In order for IEEE 1588 to be deployed across wide area networks, significant investment in the network elements is required. For process automation there are a few companies that specialize in making switches that avoid delay in propagating the IEEE 1588 synchronization messages. However other manufactures, specifically router manufactures, find it economically difficult to deploy some of the solutions the IEEE 1588 standard proposes for dealing with queuing delays within the network elements.

There are two methods in IEEE 1588 to avoid delays at the network switching routing elements. One method is to use a boundary clock and another is to utilize high priority messages. Using the boundary clock, some of the messages carry timestamps i.e., the epoch time of the devices that are trying to synchronize their clocks. This protocol works well if the communication between such devices is symmetrical with respect to delay.

A problem arises when the path becomes asymmetrical, as when switching/routing network elements add unpredictable delays. Under such a system, the sending device (device A) is a master clock and will synchronize device B's (receiver device) clock. To avoid queuing at the switch/router, the IEEE 1588 messages have to be diverted at the MAC/PHY layer. The boundary clock first synchronizes with the device A clock as a slave, and then device A clock becomes the master clock to device B, which will then synchronize it's clock to the boundary clock. This solution requires modification of the MAC/PHY chip as well as requiring a single clock to manage all possible ports. This could be done with some effort on a switch/router with bus architecture. However, doing this on a switch/router with crossbar architecture is, at best, challenging. Therefore for the foreseeable future it is doubtful if such changes will be implemented in the switching network because of complexity and cost. However, in situations, such as process automation where the cost of the switches is much higher (and the consumer's economic return is higher) than it is for the Internet, there may be freedom to implement these schemes, but in data networks synchronizing clocks remains a problem.

BRIEF SUMMARY OF THE INVENTION

By equipping receiving devices in a network with synchronizable clocks it is possible to periodically send an "impulse" signal that is received by all of the clocks at the same (or relatively the same) instant of time. The accuracy of the impulse clock need not be high, only that its signal reach all the clocks approximately at the same time. In one embodiment, a transmitting device, upon receipt of the synchronizing impulse signal, sends a packet of data bearing the sending device's epoch time-stamp to a receiving device. The data packet makes its way through the network to the receiving device and the time-stamp is used by the receiving device to calculate the difference between the epoch time of the receiver and the epoch time of the sender. Effectively, this procedure removes the unknown network transit times from the equation and allows the devices to operate in a synchronized manner.

BRIEF DESCRIPTION OF THE DRAWING

FIG. 1 shows one embodiment of the inventive concept having two device clocks that must be synchronized;

FIGS. 2A and 2B show an illustration of the calculations made for clock synchronization; and FIGS. 3A and 3B show one embodiment of a process for establishing clock synchronization.

DETAILED DESCRIPTION OF THE INVENTION

FIG. 1 shows one embodiment 10 of the inventive concept having two device clocks 120, 130 in devices 12 and 13, respectively, that are to be synchronized. It is assumed that clocks 120 and 130, as will be seen, are capable of receiving a sync signal, either via a wire, optically (either via air or in fiber), or wireless technologies of various frequencies/wave lengths and modulation schemes (such as, for example, 802.11, Bluetooth, TV RF), or via vibrations, such as impulses, etc. The sync (timing control) signal is not a signal that actually synchronizes the clocks directly as is done in GPS systems where the GPS sends an impulse every one second that is followed via a different channel (RS 232) with a value i.e., epoch time for alignment purposes, but rather the sync signal indicates that a specific event has occurred. Based on this specific event the clock to be synchronized will know how far it has wondered from the time of a system masters clock.

A Sync Generator (SG), such as SG 110, is used to provide the sync signal. SG 110 could be a part of switch/router element 11 or it could reside outside of the element. SG 110 signals an event periodically. The sync signal could be generated at each clock location based upon another event, such as a received signal and each clock then "counts" down from that signal and creates its own sync pulse.

Clocks 120 and 130 (and any other clocks to be synchronized) could either reside on a linecard of the router/switch or could be inside a Smart Gigabit Interface Converters (GBIC) or at any other location. The clocks outside the switch/router domain may synchronize with the rest of the world using IEEE 1588. Any switch/router port clock, for example, the master port clock could act as a SG. It should be noted that the SG could be one of the Smart GBIC clocks if the clocks that are to be synchronized are inside Smart GBICs. The SG could be an infrared strobe device that the clocks could receive via infrared receivers, or the impulse could be sound or vibration. The frequency of the SG signals will depend upon the synchronization accuracy desired, but as will be discussed, the stability of the SG itself is not an issue. In the switch/router implementation, the SG could be a backplane clock with its signal propagated to the switch/router ports. The frequency of the SG signal could be approximately 1 second but could be more often, if desired.

One key aspect is that all of the clocks associated with a specific switch/router must receive the SG signal at approximately the same instant. In some cases it is possible to permanently adjust (tune) the delay of the impulse so that it will arrive at all devices at the same time. However, some delays in propagation in the range of a few nanoseconds could be tolerated.

If desired, the system could be used as a distributed 1588 boundary clock arrangement since such device would have a low latency/low jitter short-distance communication path that sends 1-bit on a periodic basis. All receivers would be able to timestamp these "sync events". An important aspect of such a distribution system is that the communication path for the 1-bit impulse signal is low jitter. In such a system a remote 1588 master is directly connected via wire or fiber to the smart GBIC which is a slave to the remote master. The remote GBIC synchronizes its clock to the remote master using normal 1588 messages. The remote GBIC sees the sync event (impulse) and timestamps it. Because this clock is synced to the master, this timestamp is essentially the same value that the master would record if the master was close enough to also see the sync event. All local clocks that also see the sync event would generate a local timestamp with the assumption that the sync event is essentially simultaneously received by all local clocks (within the sync accuracy of concern). The slave GBIC then communicates its timestamp to all local clocks that also saw the same sync event. This communication can be high jitter and is assumed to go through the network element. All local clocks receiving this message can then adjust their local clock to track the slave GBIC.

In operation, as shown in FIG. 1, let's assume that the port A (12) clock 120 is the master and must synchronize the port B (13) clock 130. The process begins by port A sending a time sync message (TSM) i.e., a message with port A's epoch time-stamp imbedded therein to port B. The time-stamp is put on and the message is sent immediately upon port A receiving the SG signal from SG source 110. The TSM could be delayed by the switch/router, for example, in packet queue 111, without causing difficulty because all the slave clocks, as will be seen, will "know" when the packet is sent and will know the epoch time of the sending port, because such time is carried by the TSM.

The packet sent with port A's time-stamp, for example, under control of controller (12), will be captured at port B (13), as well as at all other ports in which clocks are to be synchronized. Since port B knows when the packet started out (because it started when port A received the same SG signal as did port B) and since the packet has the time-stamp of port A on it, port B, upon receipt of the packet, can determine how far ahead (or behind) port B's clock is from port A's clock when the packet arrives at port B.

FIG. 2A illustrates this such that packet 201 is sent from port A at port A's epoch time of, say, 15:06:03.8. It takes eight measures (in this case tenths of a second) to arrive at port B. When the TSM arrives, port B marks its own epoch time of, say 15:06:05.2.

FIG. 2B shows the calculations made at port B, for example, by controller 131, FIG. 1, to determine how far port B's clock is from port A's clock. Thus, as shown, the actual time of arrival of packet 201 is 15:06:05.2 as seen by clock 130 (port B). The transit time is 0.8 which is counted by port B (for example, by controller 131) from the SG signal which come to port B at the same instant it came to port A, which is the time the TMS was sent from port A. The sending time (as calculated by port B) is 15:06:04.4. The actual sending time (as contained in packet 201) is 15:06:03.8. Thus, port B can calculated that clock 130 at port B is running 0.6 faster than is clock 120 at port A.

Note that while it is anticipated that one packet be sent exactly when the SG signal arrives, it could be on any "tick" thereafter provided that the receiving port knows which tick it is sent on (this could be in the time code within the packet message if desired or could be a system requirement) and provided the message arrives before the next SG signal arrives at port B. Also note that messages could go out to different ports on different "ticks" again provided the receiving port knows which "tick" is being used.

In a situation when there are multiple slave clocks (multiple ports) port A would most likely send an individual message to each slave clock, since broadcasting or multicasting may not be possible if ports are on separate subnets.

In the Smart SGBIC implementation, all SGBICs could be daisy chained via an external wire. A dedicated Smart GBIC could provide the SG signal as well as the master clock signal to all Smart GBICs by sending Time Sync Message as UDP packets.

In the situation where the SG is within the router/switch device, and the SGBICs are deployed in it's ports, structure for sending the sync pulse to the slave SGBICs is required. This could be achieved by sending the signal down one of the existing tracks on a normal GBIC/SFP socket. For instance, the signal loss output from the GBIC to the host is an open collector signal that is pulled up on the host board. When the GBIC indicates a signal loss condition, it lets the voltage level be pulled up by the resistor, creating logic 1. If the received signal is fine, the GBIC or SFP pulls the signal down to a low voltage to represent logic 0. If the host were to modulate the level of the voltage on the pull-up resistor, a suitable equipped S-GBIC could detect this modulation. However an unmodified GBIC or SFP would not detect this variation and the normal signal loss functionality would not be interfered with.

If the SG signal were to be thought of as an impulse then this "impulse" could be externally created or could be derived from statistical measurements of packets that are sent from the master to the slave(s). By synchronizing all clocks to the same frequency and phase using statistical measurements then impulses could be derived (for example one second impulses) that every port notices at the same time.

FIG. 3A shows one embodiment 30 of a process at a master port for beginning synchronization. Process 301 waits for an SG impulse to be received. When the SG impulse signal is received, process 302, in conjunction with port A clock 120, time-stamps and sends a message packet to port B. Processes 303 and 304 send packets to other devices if required. These signals could be an sequential SG pulses or could be "offset" by a number of "focus" within the same SG pulse.

FIG. 3B shows one embodiment 31 of a process at slave port B for finishing the synchronization. Process 310 waits for port B to receive an impulse signal. When such a signal has been received, process 311 marks the time, of the impulse signal as maintained by clock 130. This "time" is the epoch time of port B as now captured by process 312.

Process 313 determines when a time-stamped message has been received from the master-port and records the time of the arrival using its own epoch time. Then, as shown in FIG. 2B, process 314 calculates the drift of clock B with respect to clock A. Process 305 makes any adjustment necessary to clock B to correct for the draft.

The accuracy of the synchronization depends upon the interval between the impulse signals and the receipt of a message with the time-stamp from port A. The slave clocks will each drift compared to the master with the rate of drift being controlled by its own nature. Since each slave clock adjusts its own drift after learning how much it has drifted. It is possible to make each clock adjustment individual to the port such that the adjustment might be made all at one time or over a period of time. The adjustment could be made using the rate of drift, as measured between SG impulses, to determine how much should be corrected at any one time. This eliminates the need for a big adjustment on any cycle.

Although the present invention and advantages thereof have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A network synchronization system comprising:
   network sending and receiving devices each adapted to receive a timing control signal at substantially the same time;
   a controller at a sending device, said controller operable for placing a time-stamp on a message to be sent from said sending device to a receiving device through a network at a known fixed time in relation to receipt of said timing control signal, said time-stamp being an epoch time of said sending device; and
   a controller at said receiving device operable for receiving the message and determining from the received message a difference between an epoch time of said receiving device and the epoch time of said sending device based upon said time-stamped epoch time and a transit time calculated from said known fixed time in relation to receipt of said timing control signal at said receiving device.

2. The system of claim 1 wherein said known fixed time is immediately upon receipt of said time control signal by said sending device.

3. The system of claim 1 wherein said known fixed time is an offset from said receipt of said time control signal.

4. The system of claim 1 wherein said sending device sends a message to a plurality of receiving devices, each said message bearing a time-stamp of the epoch time of said sending device; and wherein each said message is sent at a different known offset from said receipt of said time control signal.

5. The system of claim 1 further comprising:
   a clock at said receiving device;
   wherein said controller provides a drift calculation for adjusting a drift of said receiving device clock, said drift calculation based upon said determined epoch time difference.

6. The system of claim 1 wherein said timing control signal is transmitted to said network sending and receiving devices by a mechanism selected from a list consisting of: wireless RF, cabled wiring, sound, vibration, and light.

7. The system of claim 1 wherein said timing control signal is generated by a mechanism selected from a list comprising:
   electronic counter, local oscillator, phase locked loop, frequency generator, and GPS receiver.

8. The system of claim 1 wherein said timing control signal is periodic.

9. The system of claim 8 wherein a period of the periodic timing control signal is one second.

10. A method for synchronizing clocks in spaced apart network elements, said method comprising:
    sending an impulse to a plurality of said clocks, said impulse arriving at said clocks substantially at the same time;
    upon receipt of said impulse at one of said clocks, sending a message from a network device corresponding to a sending clock to at least one target clock of the plurality of said clocks, said message including an epoch time of said sending clock; and
    calculating at said target clock, upon receipt of said message at said target clock, a difference between an epoch time of said target clock and the epoch time of said sending clock, using the epoch time of said sending clock as contained in said time-stamp in relation to said impulse sent to the plurality of said clocks.

11. The method of claim 10 wherein said calculating comprises:
    comparing the epoch time of said target clock to the epoch time of said sending clock; and adjusting for network transit time of said message bearing said time-stamp.

12. The method of claim 11 wherein said adjusting comprises:
    counting the time elapsed from receipt of said impulse until the time said message arrives at said target clock.

13. The method of claim 12 further comprising:
    upon receipt of said impulse at said sending clock, also sending messages from said network device to a plurality of additional target clocks, each additional message having the epoch time of said sending clock; and
    calculating at each of said additional target clocks, upon receipt of said message at said target clocks, a difference between an epoch time of each said additional target clock and the epoch time of said sending clock, using the epoch time of said sending clock, as contained in said time-stamp.

14. The method of claim 12 wherein said timing control signal is transmitted to said clocks by a mechanism comprising at least one of: wireless RF, cabled wiring, sound, vibration, and light.

15. The method of claim 12 wherein said timing control signal is generated by a mechanism comprising at least one of: electronic counter, local oscillator, phase locked loop, frequency generator, and GPS receiver.

16. The method of claim 11 wherein said timing control signal is periodic.

17. The method of claim 16 wherein a period of said periodic timing control signal is one second.

18. A system for synchronizing clocks in separate ports of network elements, said system comprising:

means for sending an impulse to a plurality of said clocks, said impulse arriving at said clocks substantially at the same time;

means for sending a message from one of said clocks, operative upon receipt of said impulse at said sending clock, through a network to at least one target clock, said message comprising an epoch time of said sending clock; and means for calculating at said target clock, upon receipt of said message at the target clock, a difference between an epoch time of said target clock and the epoch time of said sending clock, using the epoch time of said sending clock as contained in said time-stamp in relation to said impulse sent to the plurality of said clocks.

19. The system of claim 18 wherein said calculating means comprises:

means for comparing the epoch time of said target clock to the epoch time of said sending clock; and means for adjusting for network transit time of said message bearing said time-stamp.

20. The system of claim 19 wherein said adjusting means comprises:

counting time elapsed from receipt of said impulse until the time said message arrives at said target clock.

21. The system of claim 18 wherein said impulse sending means comprises means for generating a signal comprising one of an electronic counter, a local oscillator, a phase locked loop, a frequency generator, and a GPS receiver.

22. The system of claim 18 wherein said impulse is periodic.

23. A distributed boundary clock network comprising:

a master clock;

a plurality of other clocks;

a low-jitter communication path extending among said master clock and said plurality of other clocks;

means for synchronizing said master clock to one clock of said plurality of other clocks using 1558 messaging, said one clock becoming a remote master clock;

means for distributing a sync signal to said plurality of other clocks, including said remote master clock, using said low-jitter communication path;

means for sending a time-stamped message from said remote master clock to remaining other clocks of said plurality of other clocks upon receipt of said sync signal at said remote master clock; and means for calculating a time difference between said remote master clock and each of said remaining other clocks at each of said remaining other clocks using said time-stamped message from said remote master clock and a time at which said sync signal is received at each of said remaining other clocks, respectively.

24. The distributed boundary clock network of claim 23 wherein said network comprises:

at least one Gigabit Interface Converter.

\* \* \* \* \*